M. GRÜNWALD.
DEVICE FOR MAKING HOLLOW SUGAR ARTICLES.
APPLICATION FILED APR. 30, 1914.
1,205,886.
Patented Nov. 21, 1916.
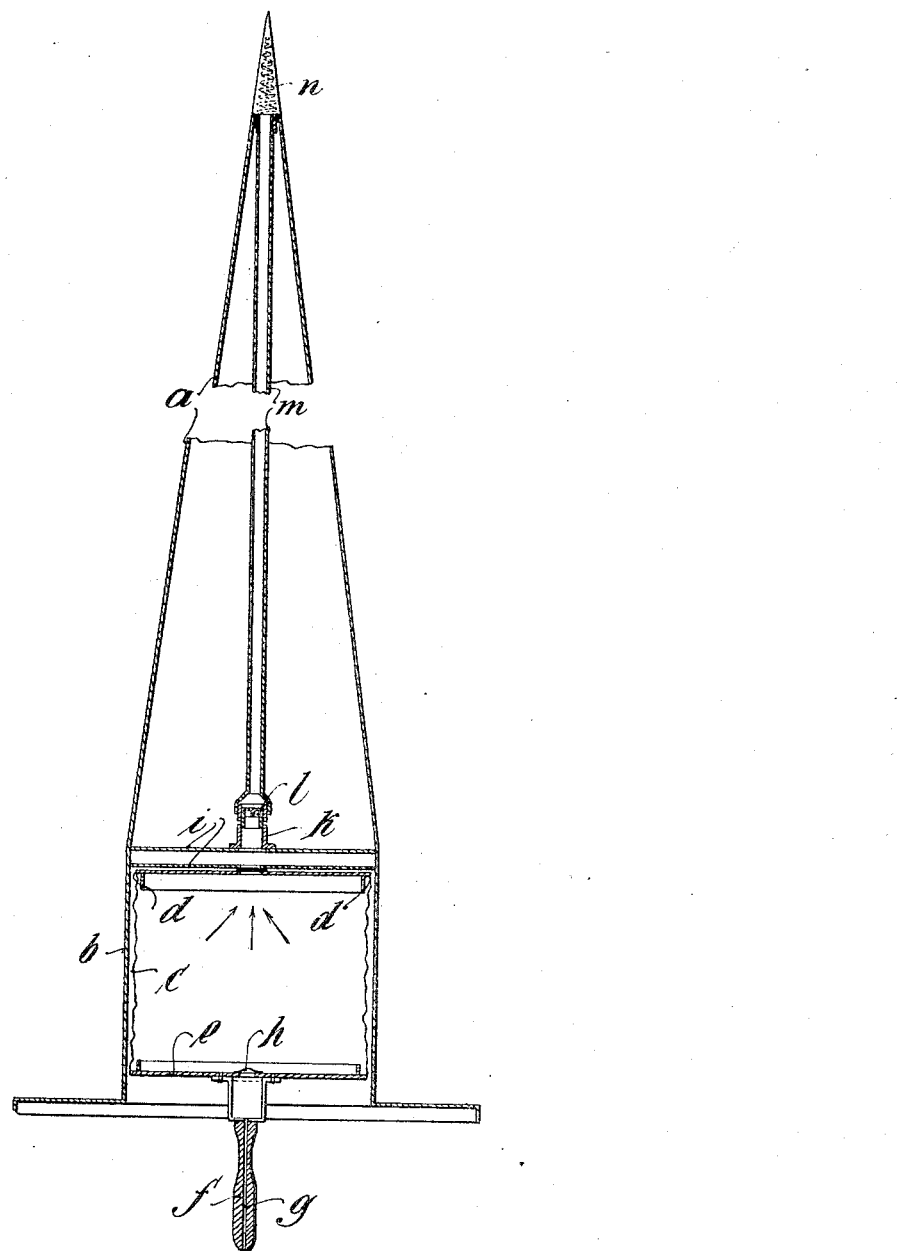
Witnesses:
Inventor:

UNITED STATES PATENT OFFICE.

MARTIN GRÜNWALD, OF TEMESVÁR, AUSTRIA-HUNGARY.

DEVICE FOR MAKING HOLLOW SUGAR ARTICLES.

1,205,886.   Specification of Letters Patent.   Patented Nov. 21, 1916.

Application filed April 30, 1914. Serial No. 835,470.

*To all whom it may concern:*

Be it known that I, MARTIN GRÜNWALD, a subject of the King of Hungary, residing at Temesvár, in the Empire of Austria-Hungary, have invented certain new and useful Improvements in Devices for Making Hollow Sugar Articles, of which the following is a specification.

The subject of this invention is a device in the form of a hollow cone for turning out hollow sugar goods, a cylindrical portion connected with the cone containing a blower provided with a tube having its outlet in the apex of the cone, by which means the hollow sugar article formed on said cone can be distended by blowing it out. It can then be further worked or treated in any desired manner, and the confectionery made thereof offers to the eye a well proportioned pleasing appearance, and its weight is very light.

One form of the device is illustrated by way of an example in the accompanying drawing which shows a longitudinal section of the same.

$a$ denotes the well known hollow cone, which is preferably made of tinned sheet iron. A cylindrical extension $b$ at the base of the cone and surrounded by an annular plate, contains a blower $c$ made of leather or the like with a front plate $d$, which is fixed to a double cross wall $i$, and with a rear plate or disk $e$. A handle $f$ is fixed on the disk $e$ said handle having a longitudinal perforation $g$ which leads to a check or non-return valve $h$ arranged in the disk $e$. On the double cross wall $i$, which has an opening at its center, there is fixed a projecting socket $k$, which is fitted with a check or non-return valve $l$ and to which is secured a tube $m$ leading to the apex of the hollow cone.

The end of the tube $m$ is tapered to a fine open point which is surrounded by a detachable cone-shaped spiral wire leaving an open point and being provided with a cover of suitable fabric.

In order to produce the hollow sugar cone or article, the mandrel of the device is covered in the usual way with sugar paste, which is drawn away from the pointed end of the mandrel. The hollow sugar article which has already been formed in this manner can be distended by the air, and its form can be variously enlarged by repeatedly operating the blower by means of the handle $f$.

On compressing the blower its valve $h$ will close, while the valve $l$ opens and air will be forced through the tube $m$ into the space in the sugar paste. In re-filling the blower the valve $l$ will close and valve $h$ will open to emit air through the hollow handle $f$ into the blower. The sugar article thus produced by enlarging its circumference by means of air pressure, can now be cut up in the usual way into pieces of any desired length.

I claim:

In a device of the form of a hollow cone for turning out hollow sugar goods a cylindrical extension at the base of the cone, a blower therein, said blower being in communication with a tube in the cone and having its outlet in the apex of the cone, substantially as described.

In testimony whereof I have affixed my signature in presence of two witnesses.

MARTIN GRÜNWALD.

Copies of this patent may be obtained for five cents each, by addressing the "Commissioner of Patents, Washington, D C."